(12) United States Patent
Watling

(10) Patent No.: US 8,348,000 B2
(45) Date of Patent: Jan. 8, 2013

(54) SNOWMOBILE SUSPENSION AND DRIVE TRAIN

(76) Inventor: Shawn Watling, Warsaw (CA)

(*) Notice: Subject to any disclaimer, the term of this patent is extended or adjusted under 35 U.S.C. 154(b) by 249 days.

(21) Appl. No.: 12/880,285

(22) Filed: Sep. 13, 2010

(65) Prior Publication Data
US 2011/0061959 A1    Mar. 17, 2011

Related U.S. Application Data

(60) Provisional application No. 61/242,427, filed on Sep. 15, 2009.

(51) Int. Cl.
*B62B 5/02* (2006.01)
(52) U.S. Cl. .................................. 180/193; 180/128
(58) Field of Classification Search .............. 180/190, 180/191, 193, 127, 128
See application file for complete search history.

(56) References Cited

U.S. PATENT DOCUMENTS

| 4,307,788 | A  | * | 12/1981 | Shelton ........................ 180/181 |
| 8,167,073 | B2 | * | 5/2012 | Polakowski et al. .......... 180/190 |
| 2004/0007914 | A1 | * | 1/2004 | Lemieux ...................... 305/127 |

* cited by examiner

*Primary Examiner* — Kevin Hurley

(57) ABSTRACT

Snowmobile suspension components for use in a snowmobile having a snowmobile suspension, the suspension components include at least two torlateral link arms connected rigidly at one end to a pivot shaft and at the other ends slideably received within slide bushings. The pivot shaft is connected pivotally to a frame member of a snowmobile and the slide bushings connected to a slide rail of the snowmobile suspension. Preferably the pivot shaft further including shock flanges rigidly connected thereto for receiving one end of a shock, wherein the other end of the shock connected to the slide rail.

3 Claims, 14 Drawing Sheets

SNOWMOBILE SUSPENSION AND DRIVE TRAIN

This application claims priority from previously filed U.S. provisional application No. 61/242,427 by Shawn Watling under the title SNOWMOBILE SUSPENSION AND DRIVE TRAIN on Sep. 15, 2010.

FIELD OF THE INVENTION

The present invention relates to a snowmobile suspension and drive trains.

BACKGROUND OF THE INVENTION

Traditional snowmobile drive trains use a forward drive axle driven by a jack shaft which obtains power from a secondary clutch thereby driving the forward part of the track. The present invention uses a rear drive which includes a chain and sprocket drive thereby driving the rear part of the track.

DESCRIPTIONS OF THE DRAWINGS

The invention will now be described by way of example only with reference to the following drawings in which.

DETAILED DESCRIPTION OF THE PREFERRED EMBODIMENT

Figure 1:
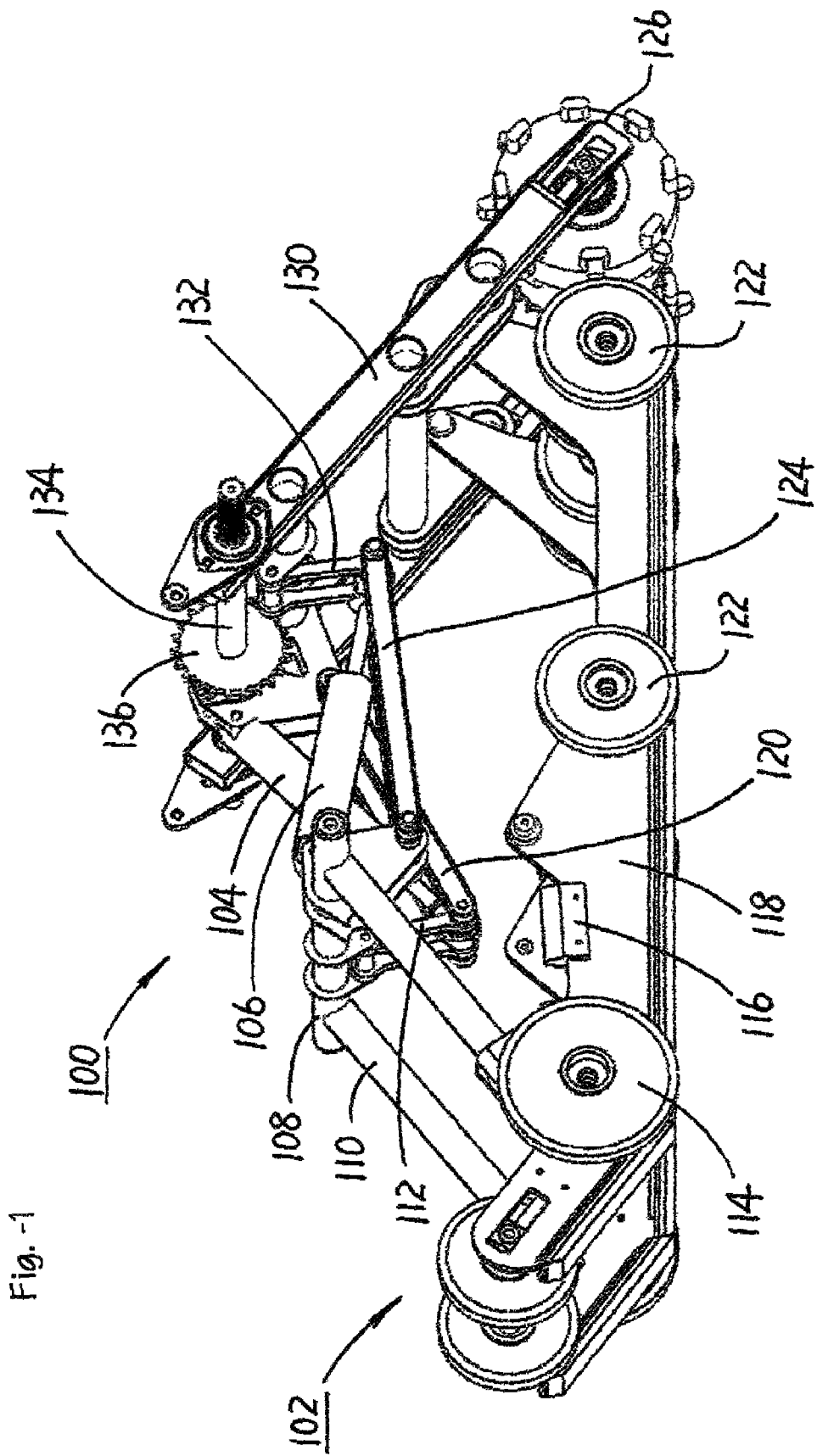
FIG. 1 is the front perspective schematic view of the snowmobile suspension.
Figure 2:
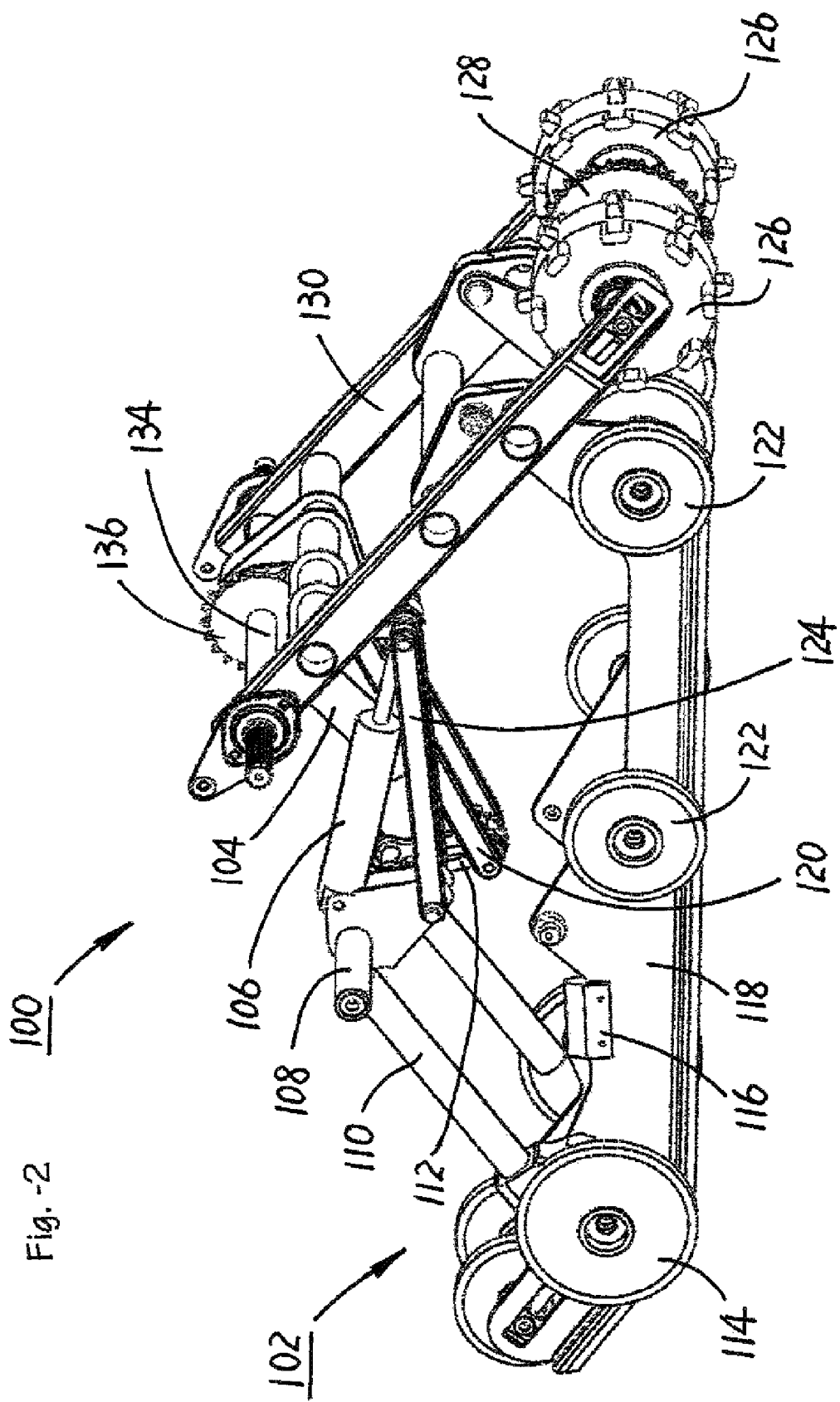
FIG. 2 is the rear perspective schematic view of the snowmobile suspension.
Figure 3:
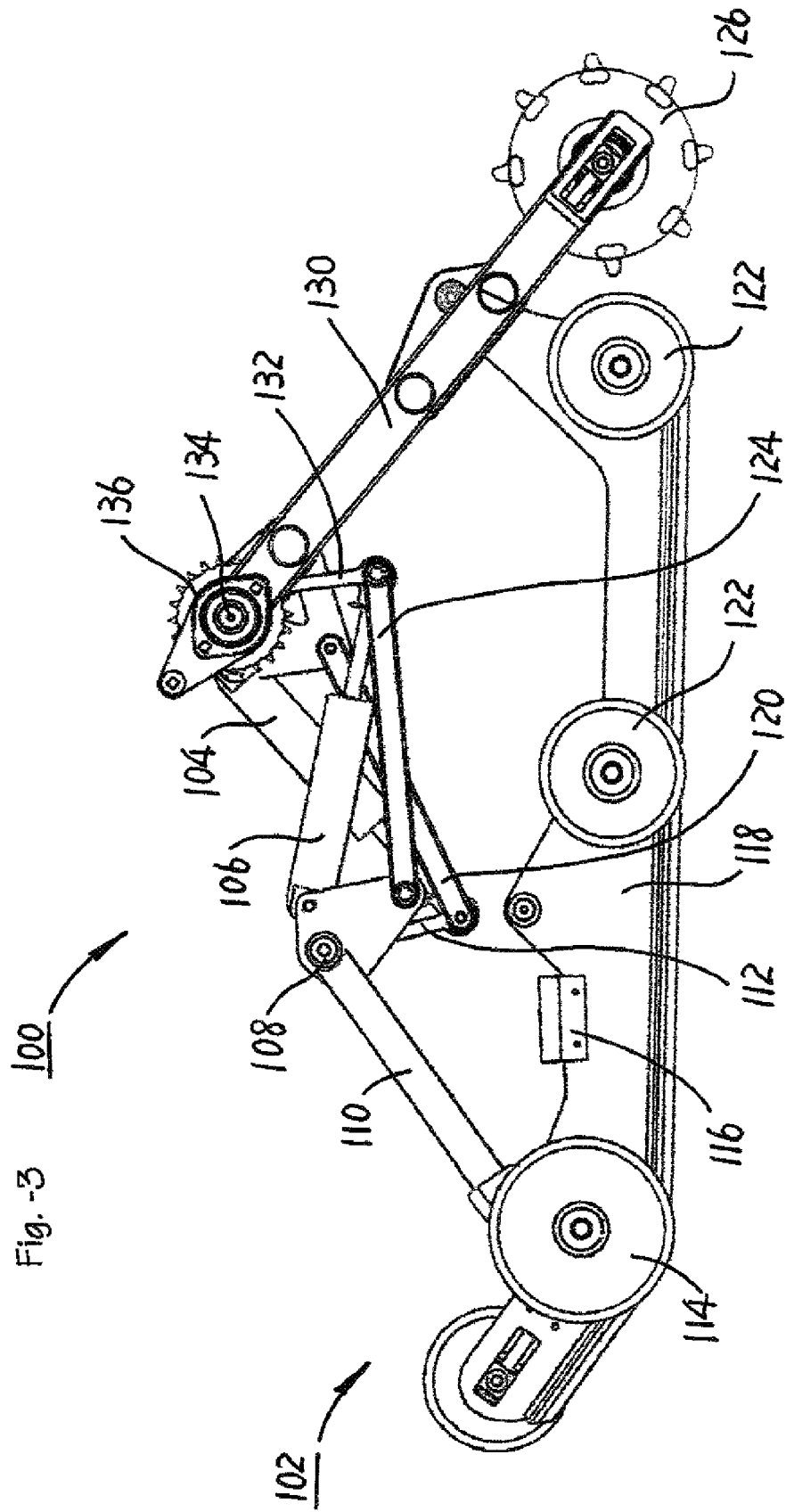
FIG. 3 is the side plan schematic view of the snowmobile suspension.
Figure 4:
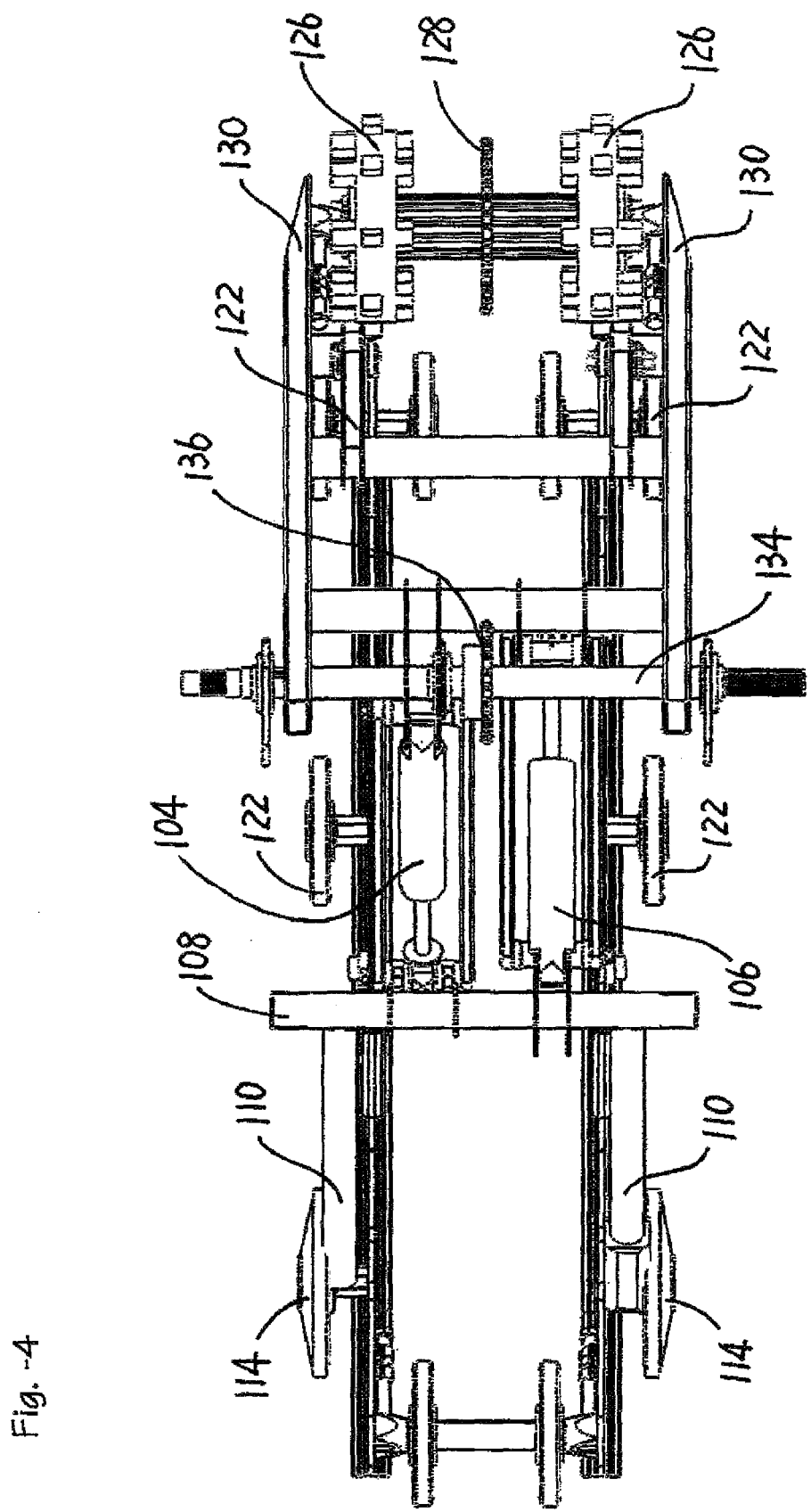
FIG. 4 is the top plan schematic view of the snowmobile suspension.

The snowmobile suspension shown generally as 100 includes the following components:

Suspension shock components 102, ladder frame shock 104, torlateral shock 106, suspension shaft 108, torlateral link arm 110, ladder frame pivot link 112, front idler 114, bump stop 116, slide rail 118, ladder frame tension link 120, idler wheel 122, torlateral tension link 124, track sprocket 126, driven sprocket 128, ladder frame 130, jackshaft 134, jackshaft sprocket 136, motor pulley 140, drive belt 142, jackshaft pulley 144, frame member 146.

Referring now to FIGS. 8 through 13 inclusively which depict an alternate embodiment namely snow mobile suspension 200, which includes torlateral suspension components 201 and drive components 203.

Figure 8:
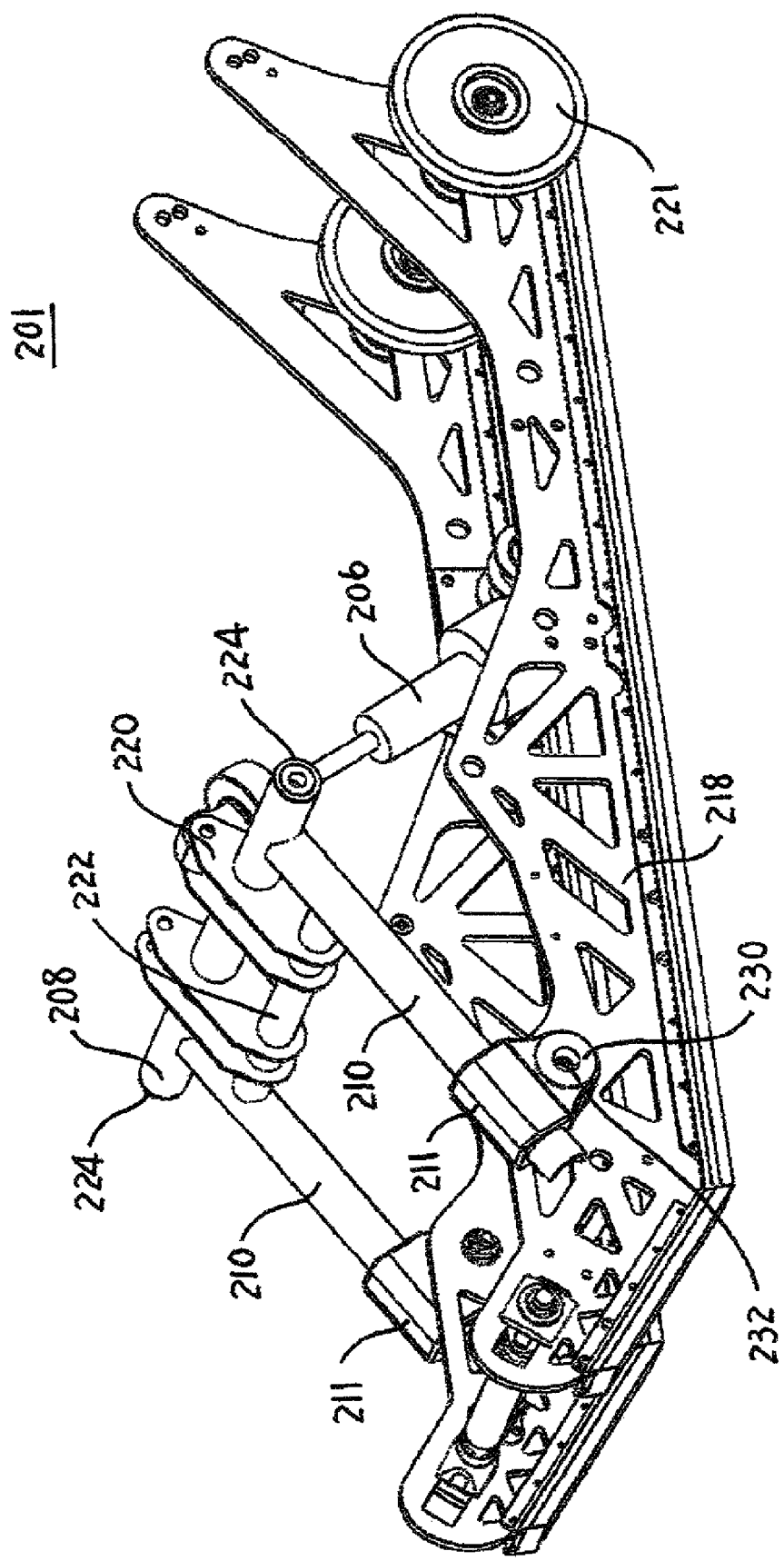
FIG. 8 is a partial front schematic view of torlateral suspension components.

The torlateral suspension components are shown deployed onto a slide rail 218 in FIG. 8.

Torlateral suspension components 201 include pivot shaft 208 having pivot shaft ends 224 and having mounted thereon shock flanges 220, which connect at one end to shock 206. The other end of shock flanges 220 connect to a reinforcing bar 222, which is rigidly connected to each of the torlateral link arms 210. Torlateral link arms 210 are slidably received within slide bushing 211 and are attached to slide rail 218 at bushing flange 230 with a bushing aperture 232. Slide rail 218 also shows having attached an idler wheel 222.

Figure 9:
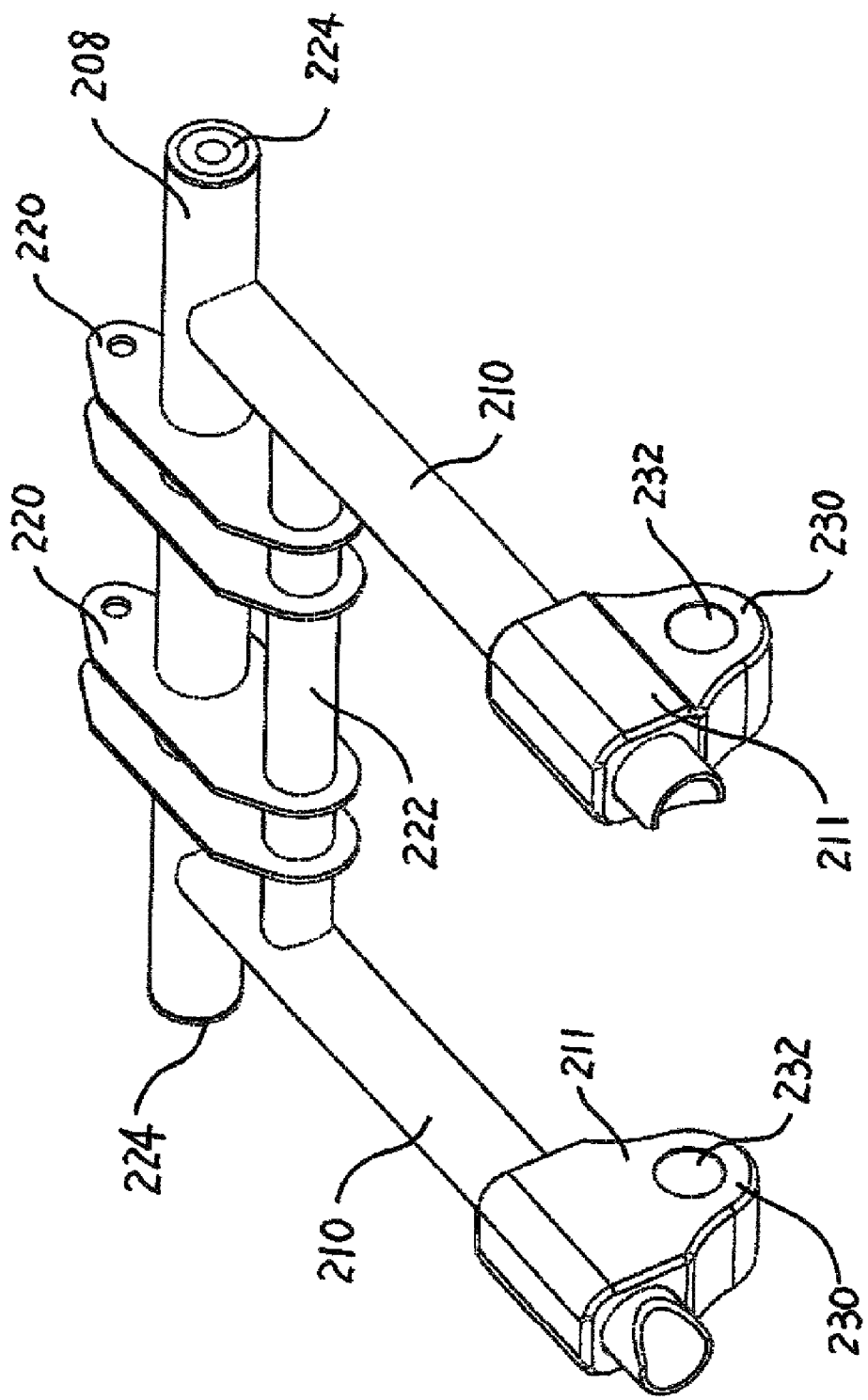
FIG. 9 is a front perspective schematic view of some selected torlateral suspension components.
Figure 10:
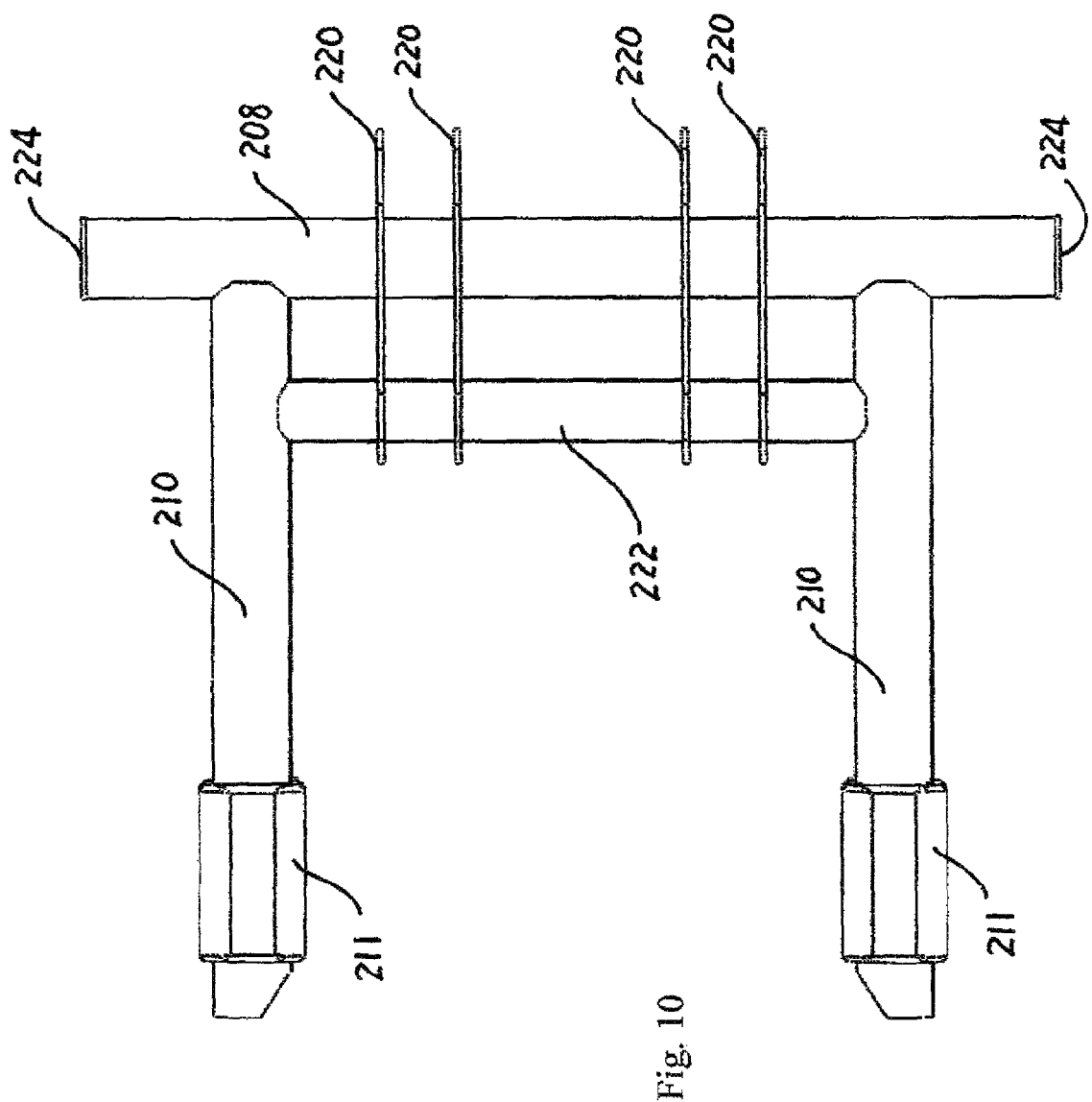
FIG. 10 is a top schematic plan view of some selected torlateral suspension components

FIGS. 9 and 10 show in isolation some of the torlateral components 201 as marked thereon.

Figure 11:
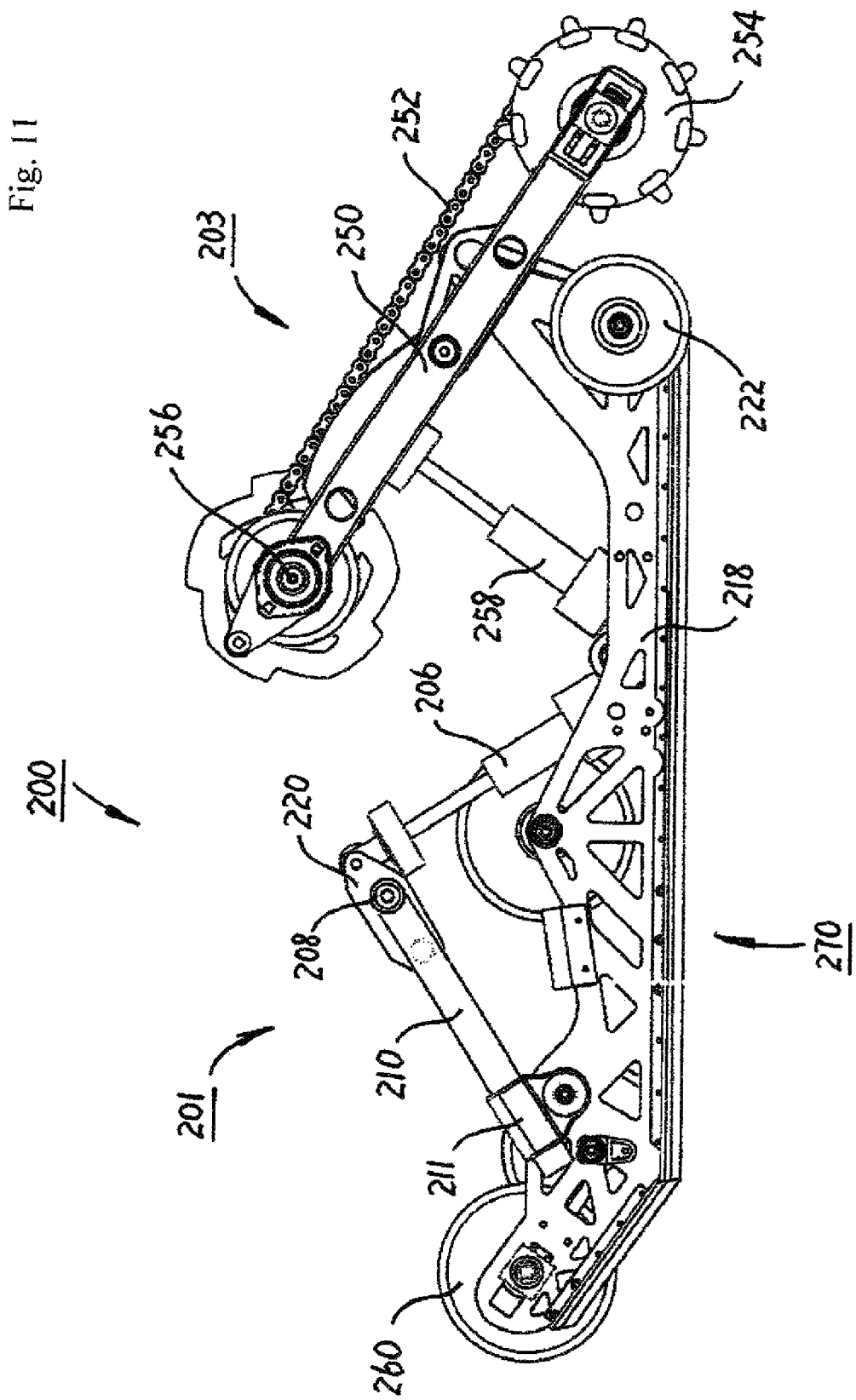
FIG. 11 is a side plan schematic view of a snow mobile suspension shown in extended position.

Referring now to FIG. 11, which depicts a snow mobile suspension 200, which includes drive components 203 and torlateral suspension components 201. This particular suspension setup uses a rear drive system wherein the rear track sprockets 254 are located at the rear portion of the track not shown.

Drive components 203 include ladder frame 250 shown pivotally attached in scissor relationship to slide rail 218 and having mounted there between a shock 258. Jackshaft 256 is driven by the motor not shown and via a chain 252 drives rear sprocket 254.

Snow mobile torlateral suspension components 201 are shown in the extended position, which would normally be when the snow mobile has minimal to little pressure on the suspension components.

Figure 5:
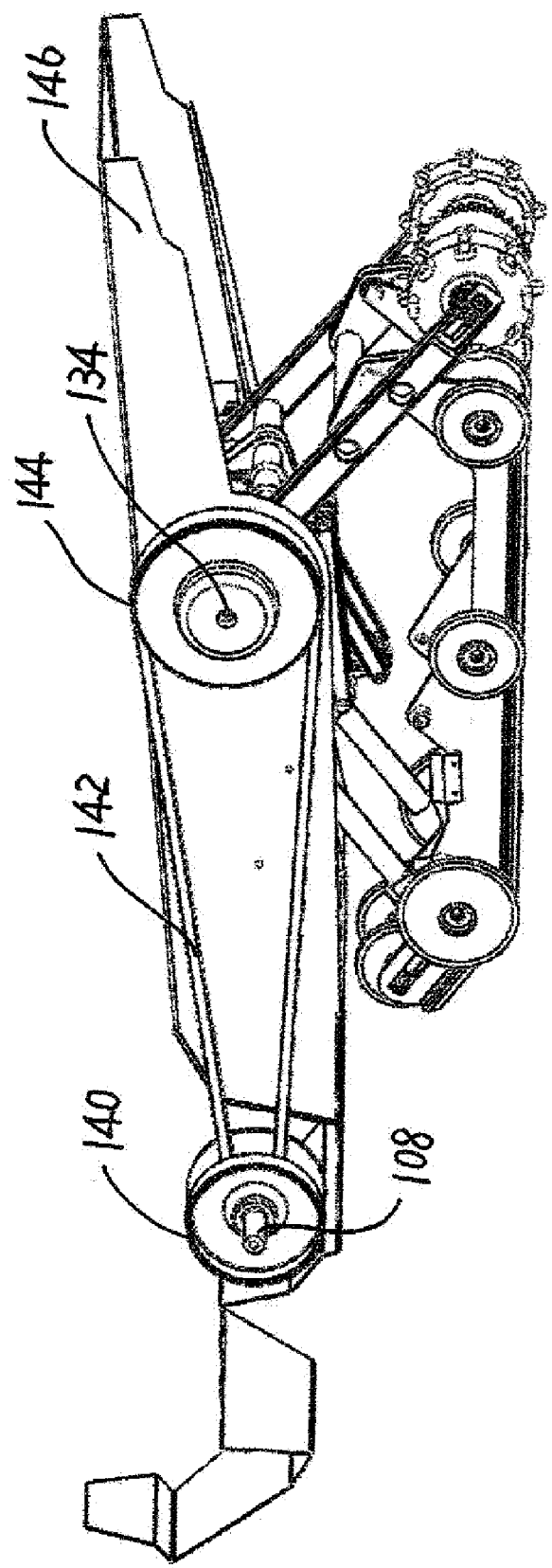
FIG. 5 is the rear perspective schematic view of the snowmobile suspension with snowmobile frame member and drive system attached.
Figure 6:
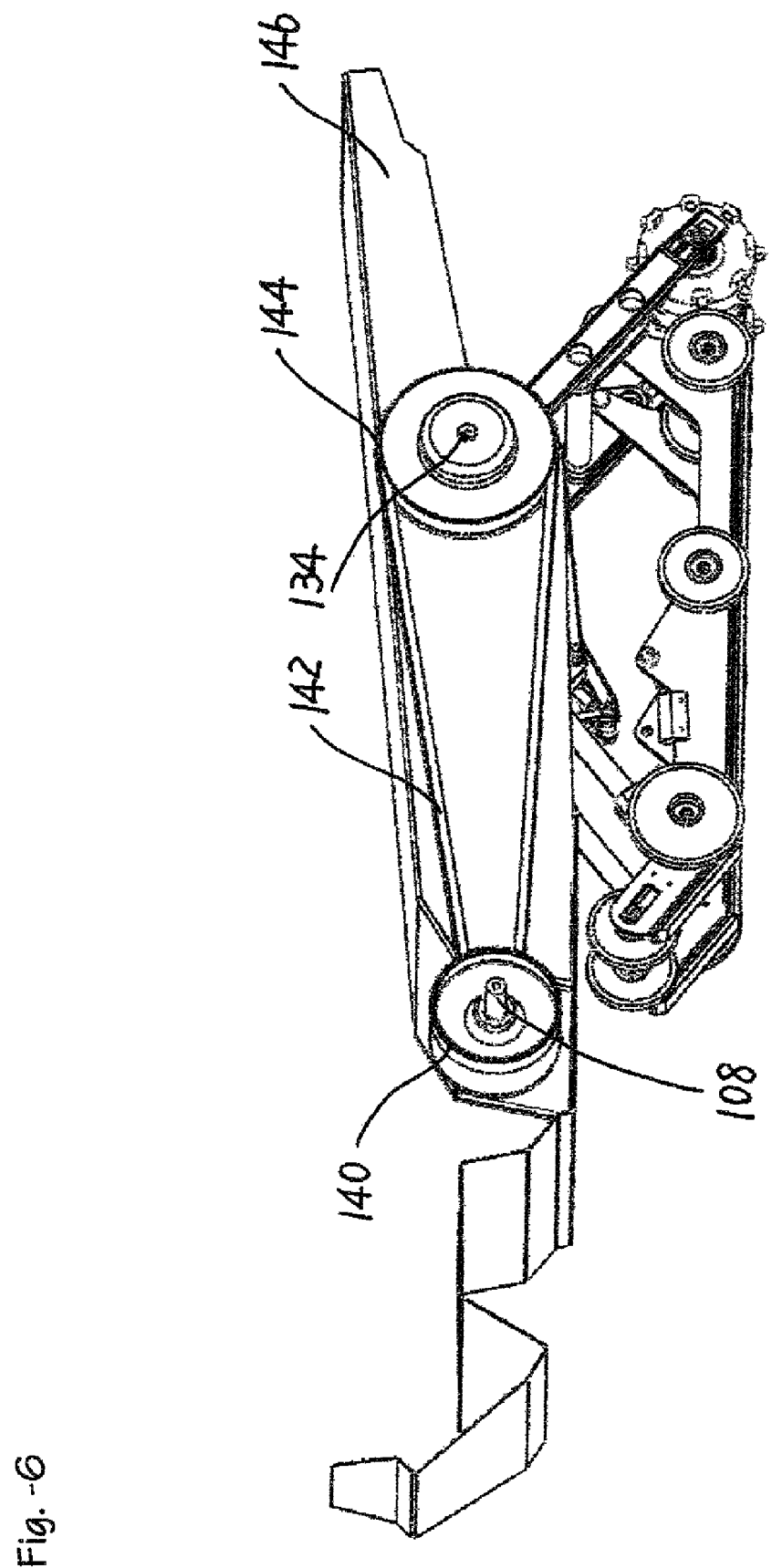
FIG. 6 is the front perspective schematic view of the snowmobile suspension with snowmobile frame member and drive system attached.
Figure 7:
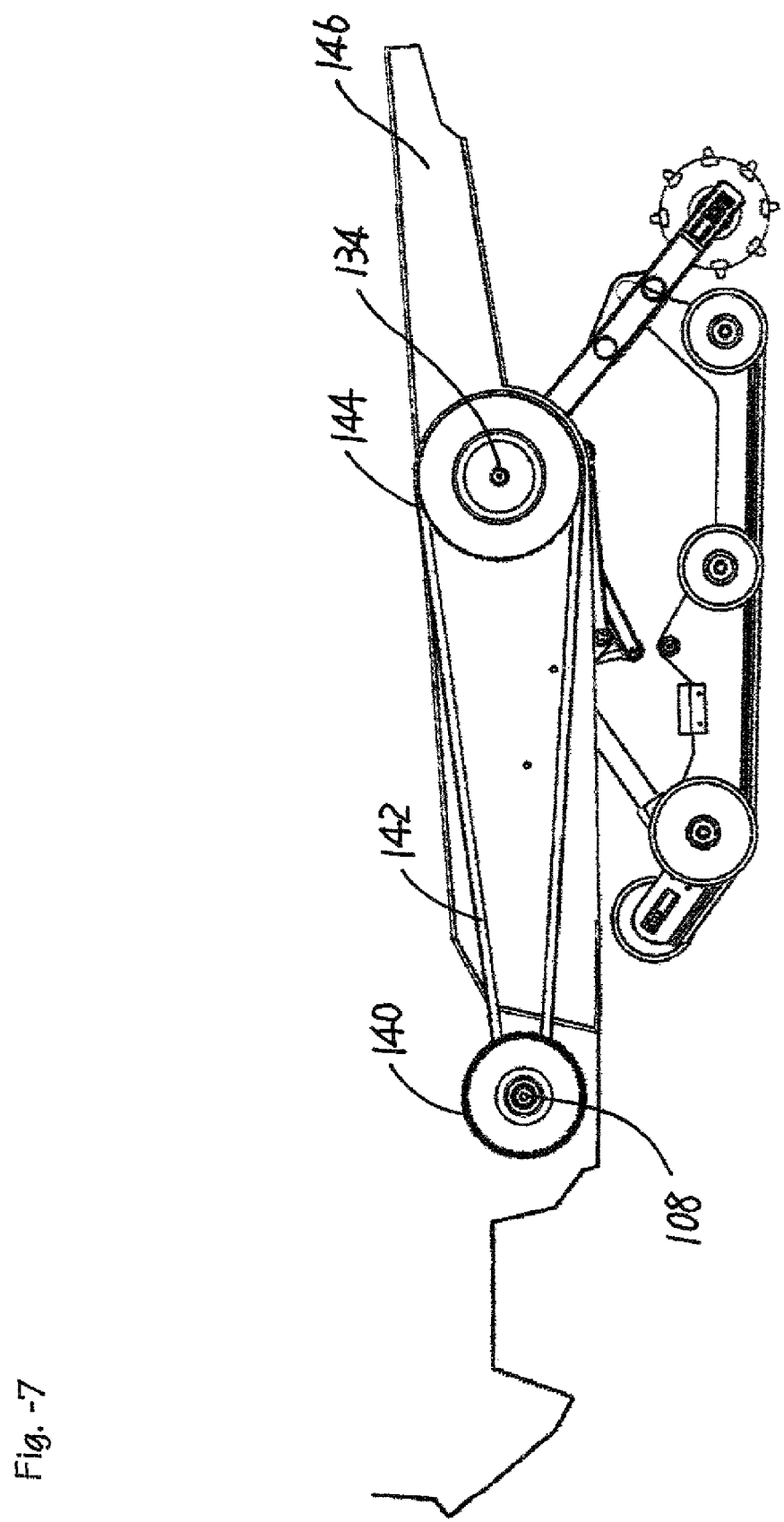
FIG. 7 is the side plan schematic view of the snowmobile suspension with snowmobile frame member and drive system attached.

Pivot shaft 208 is attached to the frame member 146 not shown in these drawing however depicted in FIGS. 5, 6 & 7. In other words the torlateral link arms 210 pivot about pivot shaft 208 during the suspension travel.

Figure 12:
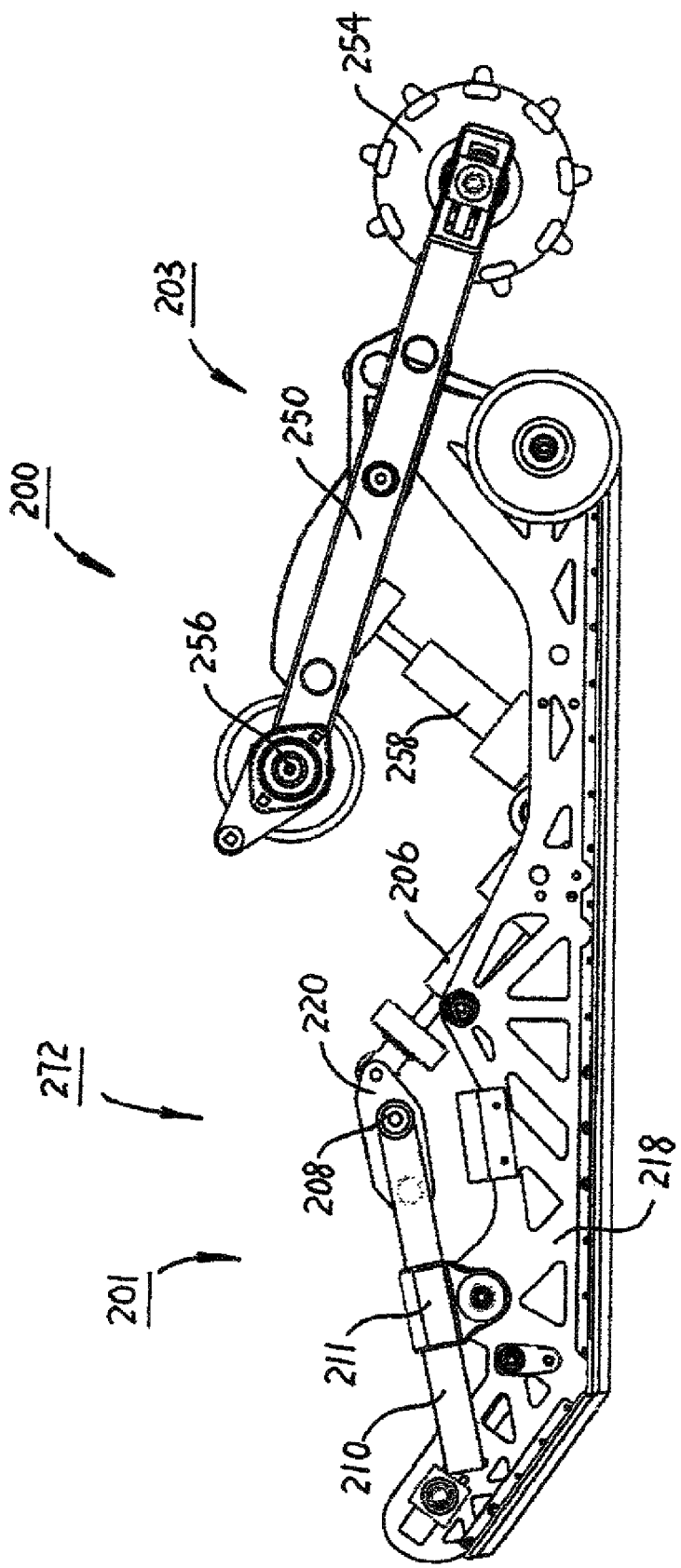
FIG. 12 is a side plan schematic view of a snow mobile suspension shown in the compressed position.

The suspension travel is between the extended position 270 and the compressed position 272 shown in FIG. 12. In compressed position 272, weight has been applied to the snow mobile frame member 146 either by the addition of passengers onto the snow mobile or in the instance when the snow mobiles suspension compresses during driving over rough terrain.

Referring to FIG. 12 in the compressed position 272 the slide rail 218 has moved upwardly toward the pivot shaft 208, which in turn causes the torlateral link arms to pivot above pivot shaft 208 and slidably move through slide bushings 211 which hold the torlateral link arms 210 in position.

The reader will note that this torlateral suspension set up allows for smooth vertical travel however is very stiff laterally meaning side to side and tortionally meaning in twisting.

Slide bushings 211 are preferably made of ultra high molecular weight plastic also known as UHMW plastic material, which is highly resistant to abrasion and provides a slick surface for ease of slide-ability of the torlateral link arms 210 through the slide bushings 211.

Figure 13:
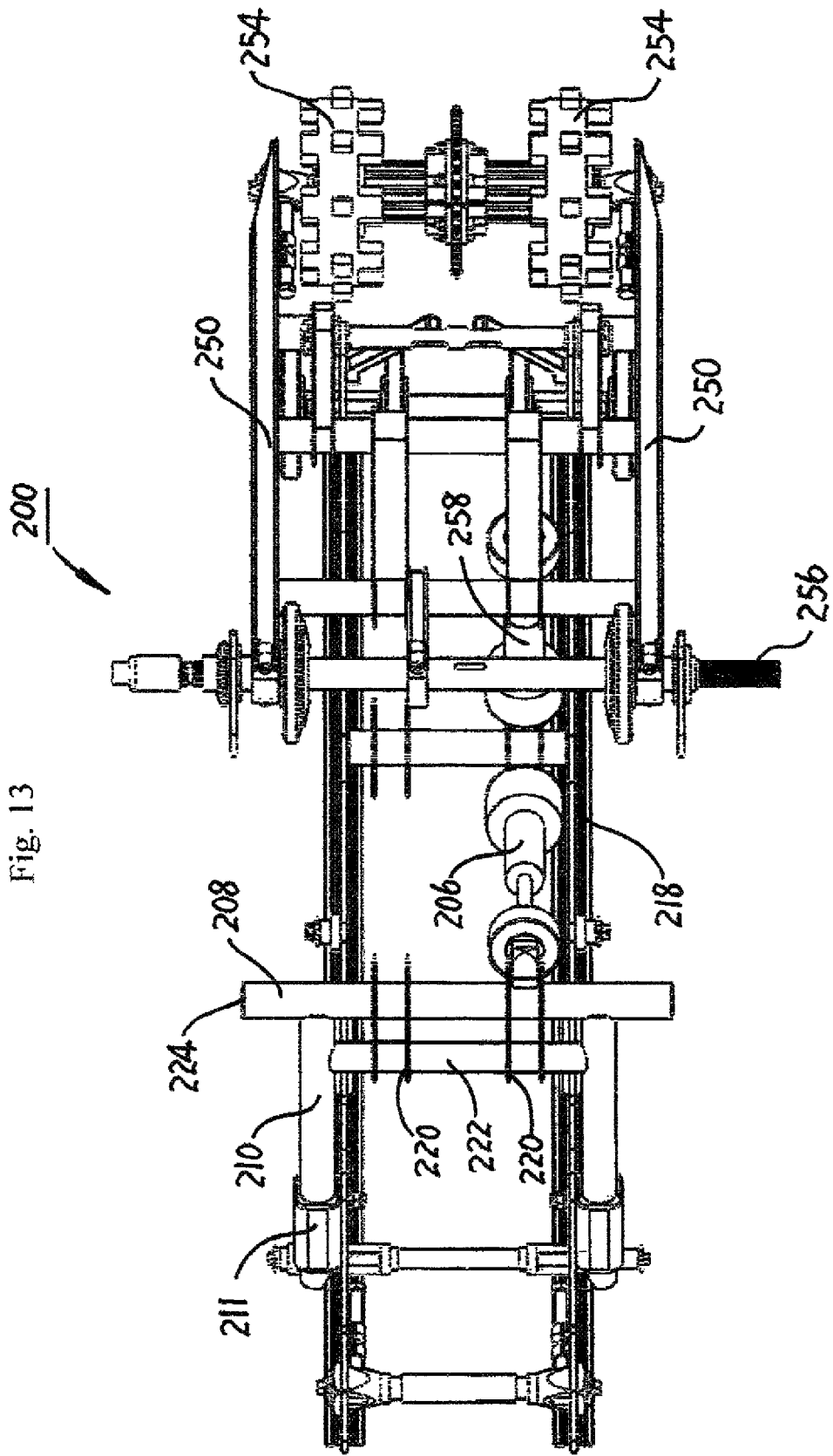
FIG. 13 is a top plan schematic view of the snow mobile suspension shown in FIG. 11.

FIG. 13 shows some selected components of the snow mobile suspension 200 from a top plan view. The reader will note that some selected components such as the second shock 206 and the second shock 258 have been removed from the drawing for better clarity. In addition the drawing does not show the chain 252, which drives the rear track sprockets 254.

Figure 14:
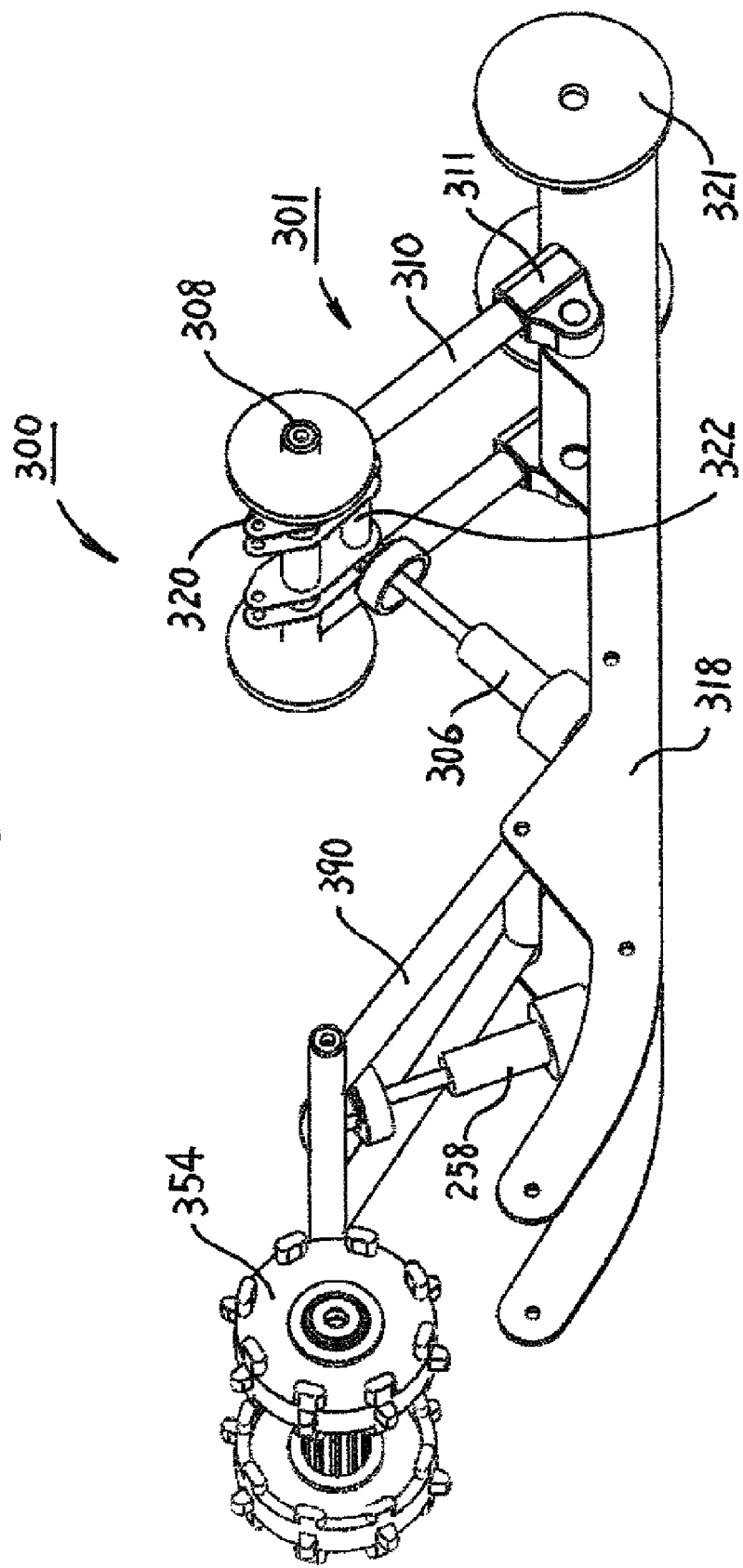
FIG. 14 is a front perspective schematic view of some selected components of a snow mobile suspension.

Referring now to FIG. 14, which is a more traditional snow mobile suspension 301 in which the track sprockets are in the forward position shown as front track sprockets 354 as in a conventional snow mobile suspension in drive setup.

The torlateral suspension components 301 include the same if not the similar type of torlateral suspension components as shown as 201 in FIG. 8 and include torlateral link arm 310, slide bushings 311, shock flanges 320, shock 306 and reinforcing bar 322.

In this case the slide rail 318 includes rear idler wheels 321.

The reader will note the torlateral suspension components 301 are located in the rearward portion of slide rail 318 rather than the forward portion of slide rail 218 as shown in FIG. 8.

In other words the torlateral suspension components 201 can be used either in the forward portion or the rearward portion of slide rail 218 or 318 and/or in both positions depending upon the suspension setup.

I claim:

1. Snowmobile suspension components for use in a snowmobile having a snowmobile suspension, the suspension components including:
    a) at least two link arms connected rigidly at one end to a pivot shaft and at the other ends slideably received within slide bushings;
    b) the pivot shaft connected pivotally to a frame member of a snowmobile;
    c) the slide bushings connected to a slide rail of the snowmobile suspension.

2. The snowmobile suspension components claimed in claim 1 wherein the pivot shaft further including shock flanges rigidly connected thereto for receiving one end of a shock, wherein the other end of the shock connected to the slide rail.

3. In combination a snowmobile chassis and snowmobile suspension components for use in a snowmobile suspension including;
    a) at least two link arms connected rigidly at one end to a pivot shaft and at the other end slideably received within a slide bushing;
    b) the pivot shaft connected pivotally to a frame member of the snowmobile chassis;
    c) the slide bushings connected to a slide rail of the snowmobile suspension.

* * * * *